(12) United States Patent
Cohen et al.

(10) Patent No.: US 7,308,646 B1
(45) Date of Patent: Dec. 11, 2007

(54) INTEGRATING DIVERSE DATA SOURCES USING A MARK-UP LANGUAGE

(75) Inventors: Simona Cohen, Haifa (IL); Tirtsa Hochberg, Haifa (IL); Haim Nelken, Haifa (IL); Ilan Paleiov, Kfar Vradim (IL); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 09/651,800

(22) Filed: Aug. 30, 2000

(51) Int. Cl.
*G06N 3/00* (2006.01)

(52) U.S. Cl. .................................................. 715/513

(58) Field of Classification Search ................ 715/513, 715/733, 517, 523, 530, 533; 707/4, 100, 707/102, 10, 104.1; 713/152; 345/733; 709/233
See application file for complete search history.

(56) References Cited

U.S. PATENT DOCUMENTS

| | | | |
|---|---|---|---|
| 5,345,586 A | | 9/1994 | Hamala et al. |
| 5,504,891 A | * | 4/1996 | Motoyama et al. ......... 715/513 |
| 5,577,169 A | * | 11/1996 | Prezioso ....................... 706/52 |
| 5,706,500 A | * | 1/1998 | Dzikewich et al. ............. 707/10 |
| 5,826,258 A | * | 10/1998 | Gupta et al. ..................... 707/4 |
| 5,828,468 A | | 10/1998 | Lee et al. |
| 5,842,213 A | * | 11/1998 | Odom et al. ................ 707/100 |
| 5,862,327 A | * | 1/1999 | Kwang et al. ............... 709/203 |
| 5,884,310 A | * | 3/1999 | Brichta et al. ................. 707/10 |
| 5,960,194 A | * | 9/1999 | Choy et al. .................. 707/102 |
| 6,009,422 A | * | 12/1999 | Ciccarelli ....................... 707/4 |
| 6,041,365 A | * | 3/2000 | Kleinerman ................. 719/328 |
| 6,088,796 A | * | 7/2000 | Cianfrocca et al. ......... 713/152 |
| 6,154,738 A | * | 11/2000 | Call ............................... 707/4 |
| 6,177,932 B1 | * | 1/2001 | Galdes et al. ............... 345/733 |
| 6,202,072 B1 | * | 3/2001 | Kuwahara .................... 715/513 |
| 6,418,400 B1 | * | 7/2002 | Webber ........................ 703/22 |
| 6,418,448 B1 | * | 7/2002 | Sarkar ...................... 707/104.1 |
| 6,449,620 B1 | * | 9/2002 | Draper et al. ............... 707/102 |
| 6,549,922 B1 | * | 4/2003 | Srivastava et al. .......... 707/205 |
| 6,618,727 B1 | * | 9/2003 | Wheeler et al. ............... 707/10 |
| 6,810,429 B1 | * | 10/2004 | Walsh et al. ................. 709/246 |
| 6,874,141 B1 | * | 3/2005 | Swamy et al. .............. 717/144 |
| 2002/0059344 A1 | * | 5/2002 | Britton et al. ............... 707/513 |

OTHER PUBLICATIONS

Connolly, D., W3 Architecture Domain, "Extensible Markup Language (XML)", http://www.w3.org/XML, pp. 1-7, Apr. 1997, pp. 1-7.

IBM Software, "IBM DB2 DataJoiner Version 2.1.1" (Software Announcement), http://www-4.ibm.com/software/data/datajoiner, pp. 1-3, Jul. 28, 1998.

(Continued)

*Primary Examiner*—Stephen Hong
*Assistant Examiner*—Kyle R Stork
(74) *Attorney, Agent, or Firm*—Darby & Darby P.C.

(57) ABSTRACT

A method for processing source data from a plurality of diverse sources in a selected data domain includes specifying a unified schema that lists markup tags in the selected data domain that can exist in a document in the markup language and defining correspondences of data fields from the sources to the markup tags listed by the schema. The source data are mapped in accordance with the correspondences to generate unified data in the markup language.

29 Claims, 4 Drawing Sheets

OTHER PUBLICATIONS

Johnson, M., "XML for the Absolute Beginner", *JavaWorld*, Apr. 1999, pp. 1-29, http://www.javaworld.com.

Harold, E.R., XSL Transformations, "Chapter 14 of the XML Bible: XSL Transformations", http://metalab.unc.edu/xml/books/bible/updates/14.html, pp. 1-17, 1999.

http://xml.coverpages.org/ctd02.html, Apr. 14, 2005.

http://www.infoloom.com/gcaconfs/WEB/philadelphia99/alschuler.htm, Apr. 14, 2005.

http://xml.coverpages.org/astmDTDSamples-Draft.txt, Apr. 14, 2005.

Fallside, D., "W3C: XML Schema Part 0: Primer", http://www.w3.org/TR/xmlschema-0, pp. 1-61 Oct. 2000.

Clark, J., "W3C: XSL Transformations (XSLT) Version 1.0", Nov. 1999, http://www.w3.org/TR/xslt, pp. 1-83.

Robie, J. et al., "XML Query Language (XQL)", http://www.w3.org/TandS/QL/QL98/pp/xql.html, pp. 1-40, Sep. 1998.

Deutsch, A. et al., "W3C: XML-QL: A Query Language for XML", http://www.w3.org/TR/1998/NOTE-xml-ql-19980819, pp. 1-17, Aug. 1998.

* cited by examiner

INTEGRATING DIVERSE DATA SOURCES USING A MARK-UP LANGUAGE

FIELD OF THE INVENTION

The present invention relates generally to information systems, and specifically to methods and systems for integration of heterogeneous data from distributed sources.

BACKGROUND OF THE INVENTION

In today's business environment, many applications need to use data that are warehoused in diverse data sources and repositories. These data are typically expressed in different formats and languages, and are retrieved using different access methods and delivery vehicles. Intermittently, new data sources may be added to the corpus that the application must handle, while existing data sources may be removed or changed. These problems are particularly prevalent in organizations in which databases and applications have developed gradually over the course of years in response to growing Information Systems (IS) demands.

There is therefore a need for tools that enable database information from diverse sources to be integrated into an accessible whole. Such tools are required, for example, in such application areas as customer relationship management, personnel data warehouses, and performance analysis of computer systems and networks. The conventional approach to meeting this need is to create a new data warehouse and to copy into it the required data from the original sources. For example, IBM Corporation (Armonk, N.Y.) offers a product known as "DB2 DataJoiner" that is based on this sort of approach. DataJoiner is described at www-4.ibm.com/software/data/datajoiner. A solution of this type is also described in U.S. Pat. No. 5,884,310, whose disclosure is incorporated herein by reference.

Another method for manipulating heterogeneous data is described in U.S. Pat. No. 5,345,586, whose disclosure is likewise incorporated herein by reference. A global data directory is provided, which maps the location of data, along with specific data entry attributes and data source parameters. Various tables are used for dealing with the diverse data properties, including an attribute table, a domain table, a routing table and a cross-reference table. The tables are used in accessing the data, in order to provide a system user with a consistent interface to multiple distributed, heterogeneous data sources.

Markup languages are well known in the programming art. The most popular markup language is the Hypertext Markup Language (HTML), which is commonly used on World Wide Web pages and in other document applications. HTML is derived from the Standard Generalized Markup Language (SGML), and uses tags to identify certain data elements and attributes. HTML, however, is not extensible, in the sense that it uses a closed set of tags, and it has little or no semantic structure. In order to address these and other shortcomings, Extensible Markup Language (XML) has more recently been introduced by the World Wide Web Consortium (W3C). XML is defined by a standard available at www.w3.org/XML.

XML allows users to define their own sets of tags, depending on their application needs. Each XML document is associated with a Document Type Definition (DTD), which specifies the elements that can exist in the document and the attributes and hierarchy of the elements. Many different DTDs have already been developed for different domains, such as "performanceML" for the computer system performance evaluation domain; "CPEX" for the customer relationship management domain; "Health Level-Seven (HL7) XML" for the healthcare domain; and "Common Telecom DTD" for the telecommunications domain. XML.ORG maintains a registry of available DTDs at xml.org/xmlorg_registry/index.shtml. XML-schema is under development as an alternative to the DTD, as described at www.w3.org/TR/xmlschema-0.

Style languages are used to control how the data contained in a markup language document are structured, formatted and presented. For example, W3C has introduced the Extensible Style Language (XSL) for use in defining style sheets for XML documents. An XSL style sheet is a collection of rules, known as templates. When the rules are applied to an input XML file by a processor running an XSL engine, they generate as output some or all of the content of the XML file in a form that is specified by the rules. (In fact, an XSL style sheet is itself a type of XML document.) XSL includes a transformation language, XSLT, which is defined by a standard available at www.w3.org/TR/xslt. Rules written in XSLT specify how one XML document is to be transformed into another XML document. The transformed document may use the same markup tags and DTD as the original document, or it may have a different set of tags, such as HTML tags. Other style languages are also known in the art, such as the Document Style, Semantics and Specification Language (DSSSL), which is commonly used in conjunction with SGML.

SUMMARY OF THE INVENTION

In preferred embodiments of the present invention, a data integration system provides unified access to data residing in diverse, heterogeneous data sources. The data integration is achieved by mapping all of the data, from all of the diverse sources, to a unified schema defined in a markup language. Preferably, the language comprises XML, and the schema comprises a DTD defined for the particular application domain to which the data belong. Alternatively, other markup languages and other schema may be used for this purpose.

In some preferred embodiments of the present invention, the system comprises an administrator application and a middleware-level lookup engine. The administrator is used to map all relevant fields in the diverse data sources to appropriate elements of the chosen schema. The mappings are stored in a repository, and are then used by the lookup engine to transform the data from the diverse data source to a unified format in the markup language, in compliance with the schema. Database access applications, such as queries, interrogate the diverse data sources through the middleware lookup engine, and so receive responses in the unified markup language format, regardless of the source of the data. As a result, differences in source format and complexities in accessing the diverse data sources are completely transparent to the application.

Preferably, a different unified schema is defined for each different domain in which the data integration system is to be used. The schema in each case should cover all of the types of data that may be relevant to the domain. XML and related markup languages are advantageous in this regard, since they allow a data hierarchy to be defined, with optional parts that can be omitted or added within a given XML document. Within the defined schema, existing data sources may be changed, and new data sources of substantially any type may be added, simply by adding the required mappings to the repository, without modification to the overall system.

These changes can even be made dynamically, while the data integration system is running, without affecting existing applications that access the system. By contrast, data integration systems known in the art are limited to static mappings, and typically require system-level modifications when a data source definition is added, deleted or changed.

There is therefore provided, in accordance with a preferred embodiment of the present invention, a method for processing source data from a plurality of diverse sources in a selected data domain, including:

specifying a unified schema that lists markup tags in the selected data domain that can exist in a document in the markup language;

defining correspondences of data fields from the sources to the markup tags listed by the schema; and mapping the source data in accordance with the correspondences to generate unified data in the markup language.

Preferably, the markup language includes Extensible Markup Language (XML), and specifying the unified schema includes specifying a Document Type Definition (DTD). Alternatively or additionally, defining the correspondences includes defining data transformation rules in Extensible Style Language (XSL), wherein mapping the source data includes transforming the data using an XSL engine.

Preferably, defining the correspondences includes selecting one or more of the data fields in the sources to correspond to one of the markup tags in the schema, and determining a conversion function to apply to the one or more data fields. Further preferably, determining the conversion function includes determining the function so as to generate a data element indicated by the corresponding one of the markup tags. Additionally or alternatively, determining the conversion function includes determining the function to generate an attribute of the unified data indicated by the corresponding one of the markup tags.

Typically, at least some of the source data are represented in a language other than the markup language, and mapping the source data includes transforming the data to the markup language.

In a preferred embodiment, the method includes querying the sources by addressing a query to the unified data in the markup language, wherein mapping the source data includes mapping the source data responsive to the query.

There is also provided, in accordance with a preferred embodiment of the present invention, apparatus for processing source data from a plurality of diverse sources in a selected data domain, including a data integration processor, which is adapted to receive and store a unified schema that lists markup tags in the selected data domain that can exist in a document in the markup language, and further to receive and store definitions of correspondences of data fields from the sources to the markup tags listed by the schema, and to map the source data in accordance with the correspondences to generate unified data in the markup language.

In a preferred embodiment, the apparatus includes a plurality of distributed data storage devices, which hold the diverse data sources, wherein the processor is adapted to retrieve the source data from the distributed devices.

There is additionally provided, in accordance with a preferred embodiment of the present invention, a computer software product for processing source data from a plurality of diverse sources in a selected data domain, the product including a computer-readable medium in which program instructions are stored, which instructions, when read by a computer, cause the computer to receive a unified schema that lists markup tags in the selected data domain that can exist in a document in the markup language and to receive definitions of correspondences of data fields from the sources to the markup tags listed by the schema, and to map the source data in accordance with the correspondences to generate unified data in the markup language.

In a preferred embodiment, the instructions further cause the computer to accept and respond to a query addressed to the unified data in the markup language, wherein the product includes middleware, which causes the computer to map the source data responsive to the query.

The present invention will be more fully understood from the following detailed description of the preferred embodiments thereof, taken together with the drawings in which:

DETAILED DESCRIPTION OF PREFERRED EMBODIMENTS

Figure 1:
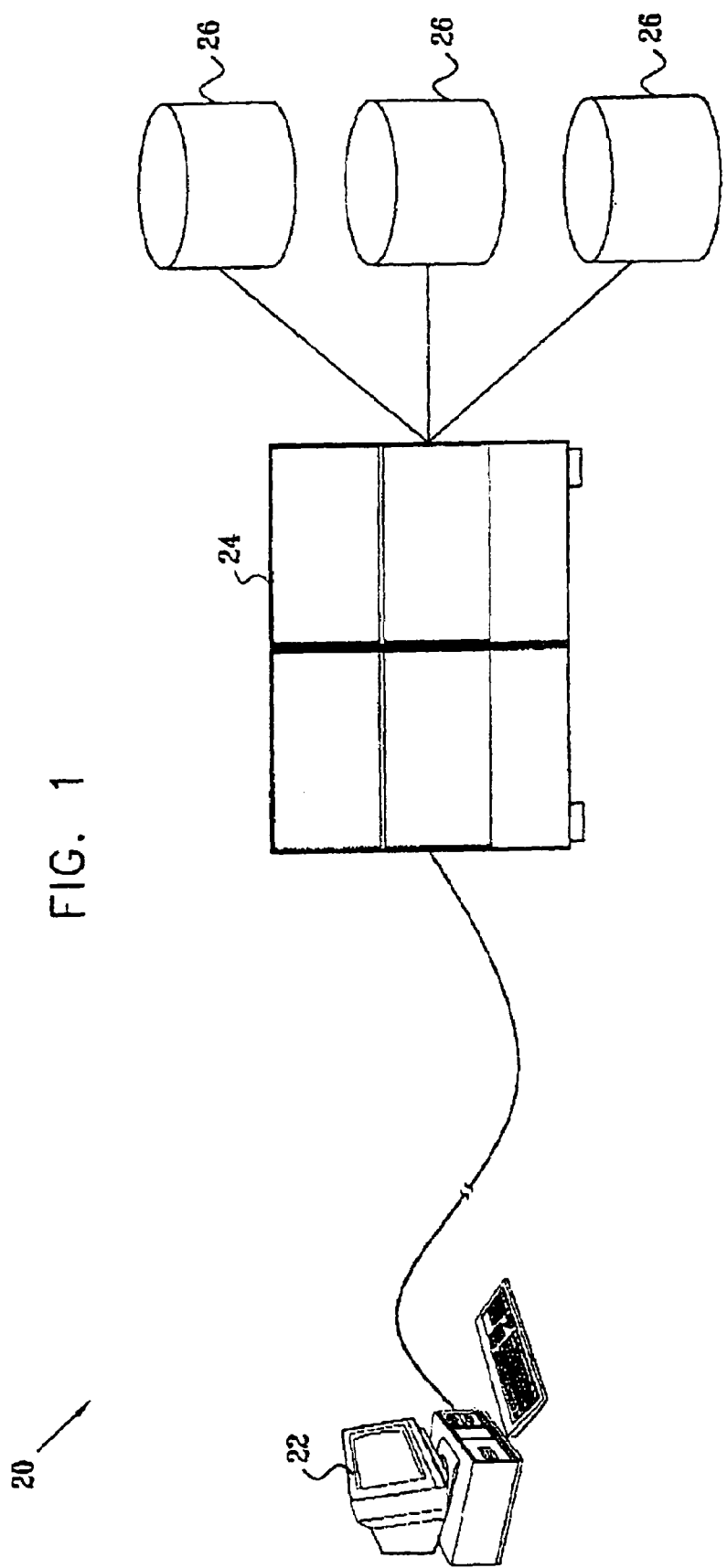
FIG. 1 is a schematic, pictorial illustration of a system for integrating diverse data sources, in accordance with a preferred embodiment of the present invention.

FIG. 1 is a schematic, pictorial illustration of a system 20 for integrating data from diverse data sources, in accordance with a preferred embodiment of the present invention. The data sources typically comprise databases stored on distributed storage devices 26. System 20 is capable of working with substantially any type of structured data, however, and it is not necessary that the data sources comprise relational databases. A data integration server 24 accesses the data on storage devices 26 and provides the data to a client computer 22, typically in response to a query from the client. The client computer may be in close proximity to the server, or alternatively, it may access the server via a network, such as the Internet. Further alternatively, the functions of the server and the client may be integrated and carried out on a single machine.

Client computer 22 and server 24 preferably comprise general-purpose computer processors, which are controlled by appropriate software to carry out the functions described hereinbelow. The software may be provided to the client and the server in electronic form, by download over a network, for example, or alternatively, it may be furnished on tangible media, such as CD-ROM.

Figure 2:
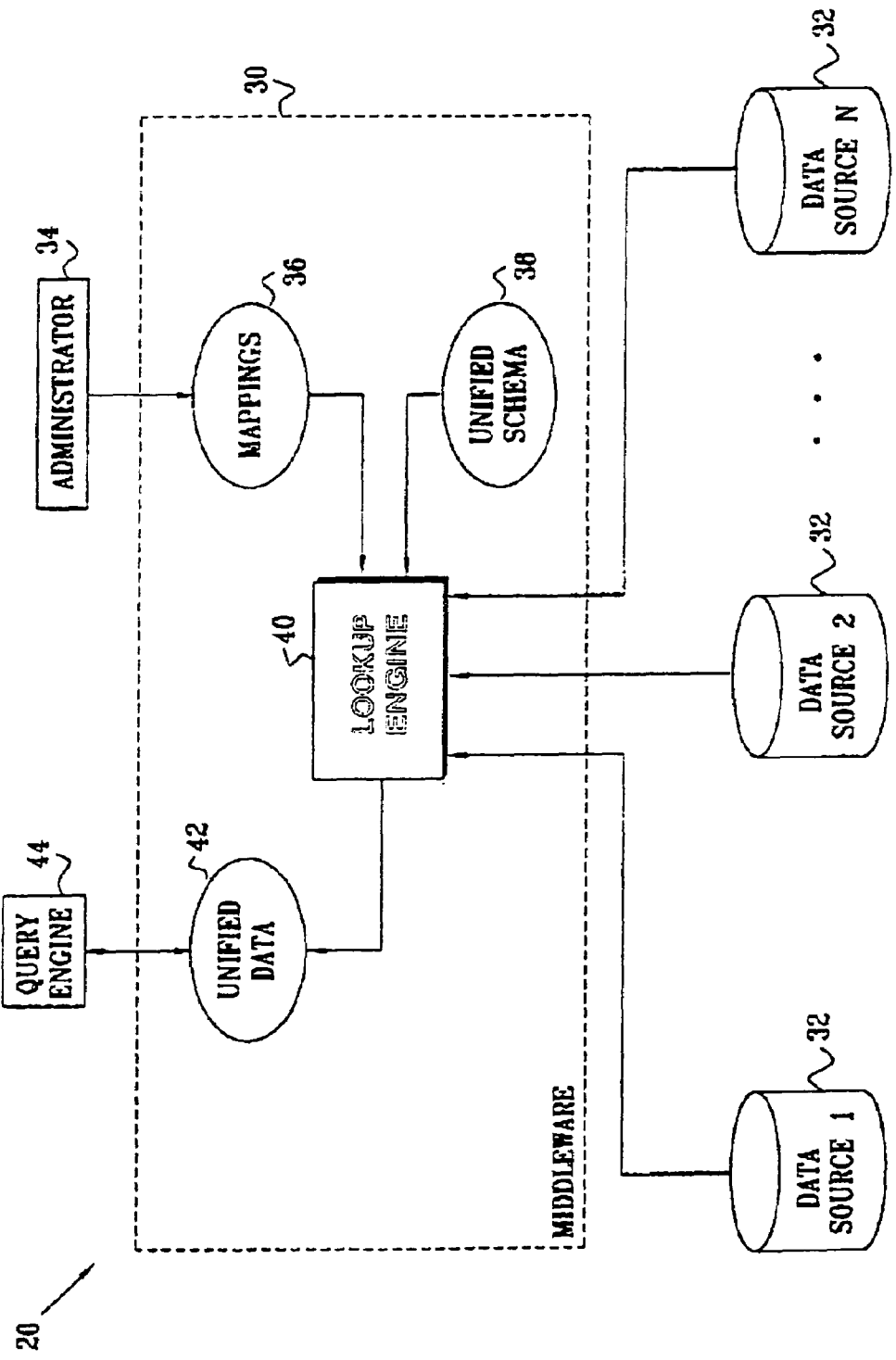
FIG. 2 is a block diagram that schematically illustrates functional elements of the system of FIG. 1, in accordance with a preferred embodiment of the present invention.

FIG. 2 is a block diagram that schematically illustrates functional elements of system 20, in accordance with a preferred embodiment of the present invention. A middleware layer 30 running on server 24 is responsible for integrating data from diverse sources 32 using XML. For each of data sources 32, an administrator application 34 is used to define mappings from the data source to a unified schema 38, as described in detail hereinbelow. The schema is preferably specified by a DTD that is defined for the domain to which data sources 32 belong, such as the performanceML or CPEX DTD noted above. The mappings defined by administrator 34 are stored in a repository 36.

A lookup engine 40 uses the mappings in repository 36 to access data sources 32 and to map the diverse data from these sources to unified data 42. The unified data are preferably represented as XML code, complying with schema 38. An application such as a query engine 44, running on client 22 or on server 24, is able to access unified data 42 substantially without regard to the differences in format and access methods among sources 32. From the point of view of the application, the diverse sources are all a single body of XML data. Query engine 44 preferably comprises an XML-based query engine, written in the XQL or XML-QL query language, for example. These languages are respectively described at www.w3.org/TandS/QL/QL98/pp/xql.html and at www.w3.org/TR/1998/NOTE-xml-ql-19980819.

Figure 3:
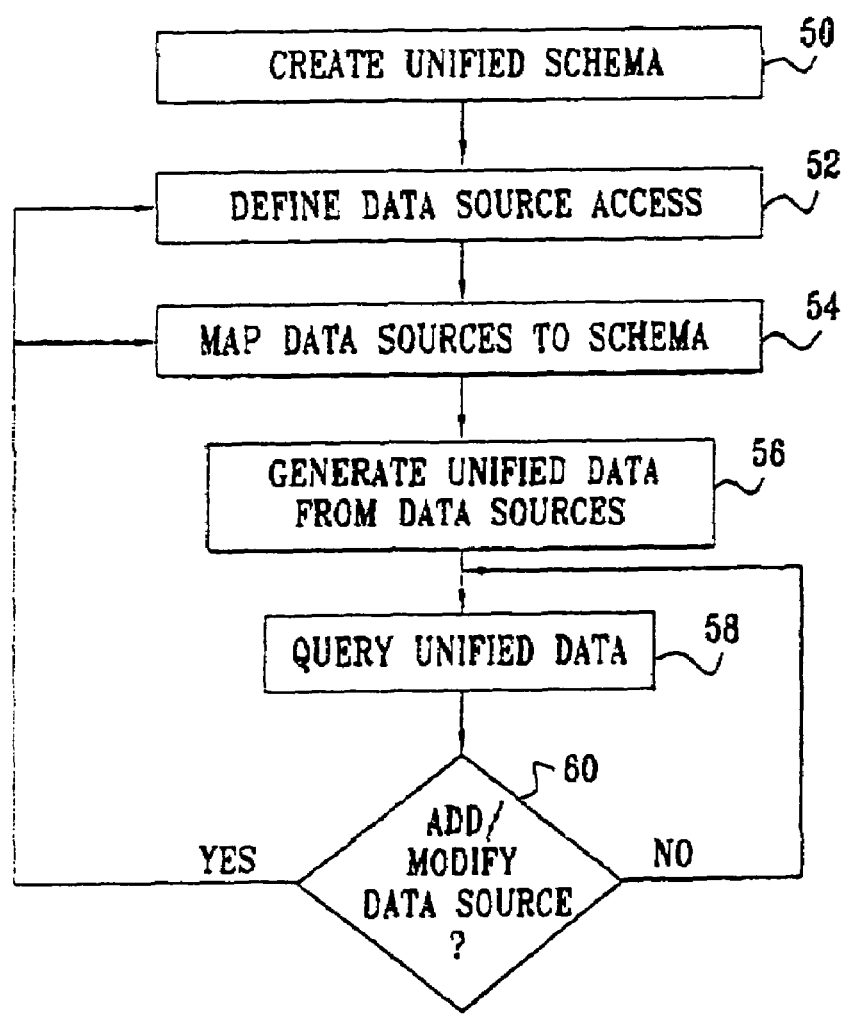
FIG. 3 is a flow chart that schematically illustrates a method for integrating diverse data sources, in accordance with a preferred embodiment of the present invention.

FIG. 3 is a flow chart that schematically illustrates a method by which system 20 integrates the data from sources 32, in accordance with a preferred embodiment of the present invention. At a schema creation step 50, unified schema 38 for the selected domain is specified. Preferably, an existing DTD is selected. Alternatively, a new DTD or other schema may be created, or another type of schema may be used, such as an XML-schema, as mentioned above. The schema should be adequate to cover all of the existing types of data in the domain and, preferably, should be easily extensible to allow the addition of tags defining new data elements within its hierarchy.

Figure 4:
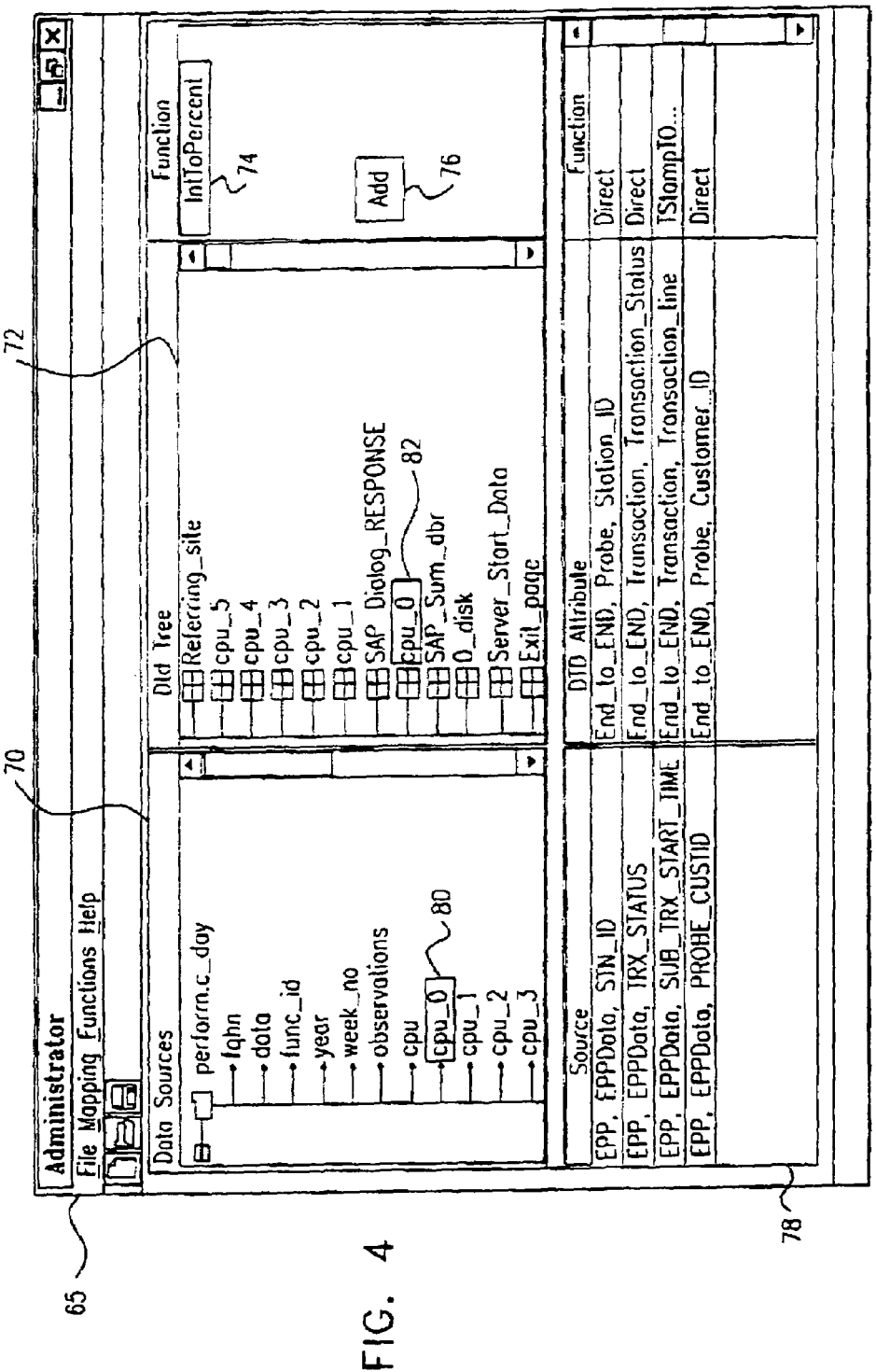
FIG. 4 is a schematic representation of a computer display used in generating mappings from diverse data sources to a unified schema.

At an access step 52, administrator 34 defines how each of data sources 32 is to be accessed. For example, if the data source is a database, the administrator preferably defines a host name and port (on a network linking server 24 to the appropriate storage device 26), the database name, and a username and password. The administrator then creates mappings from data sources 32 to schema 38, at a mapping step 54. Preferably, the mappings are created using an on-screen editor, as illustrated in FIG. 4. The editor preferably creates XSLT rules, which are used subsequently to carry out the actual mapping. Alternatively, a user of administrator 34 may create the XSLT rules (or other mapping function) by coding it directly, without the aid of a visual editor.

Preferably, each of the mappings created at step 52 is a triplet of the form <source, target, conversion function>. The source is a field or a set of fields in data source 32. The target is an element or an attribute, or a set of elements or attributes, in unified schema 38. The conversion function is a function that is applied to the data in the source in order to create a data value for the target. For example, assuming that system 20 is assembling computer performance data using the performanceML DTD, one of the triplets might be as follows:

Source—Day.cpu_utilization (the CPU utilization field in the computer's Day table).

Target—PERFORMANCE.Server.Server_Performance_Info.CPU_utilization (an element in the DTD hierarchy).

Conversion—floatToPercentage.

Lookup engine 40 creates unified data 42 from data sources 32, at a unified data generation step 56. For each mapping, the lookup engine fetches the appropriate source data from the data sources, transforms the data to XML format, and then maps the data to the target. The mapping is preferably carried out by invoking an appropriate XSL engine, as is known in the art, to operate on the XML source data using the XSLT rules created at step 54. The unified data are then available to query engine 44, at a query step 58. Typically, unified data 42 are not held as a static database, but are rather created dynamically by lookup engine 40 when required by a particular query.

A new data source 32 may be added to system 20, or an existing source may be modified or deleted, at a data source addition step 60. The change in the data sources does not substantively affect unified schema 38 itself. Therefore, it is necessary only to update access information end mappings of the new or modified data source, at steps 52 and 54. Since the schema is unchanged, there is also no need to modify query engine 44 or other applications that access unified data 42.

FIG. 4 is a schematic representation of a computer screen 65 associated with administrator application 34, in accordance with a preferred embodiment of the present invention. Screen 65 is typically displayed on a monitor of client 22, for use in interactively mapping data sources 32 to schema 38 at step 54 of the method described above. The data sources are identified in a data source window 70, while the mapping targets from the DTD tree or other schema are shown in a DTD window 72. In the example shown in this figure, the selected data source is a cpu__0 field 80 in the perform.c_day table, while the target is a cpu__0 element 82 in the DTD. The selected conversion function, chosen from a function menu, is an intToPercent function 74. Once the user has indicated the chosen source, target and conversion function, he or she selects an add button 76 to enter the mapping in repository 36. A mapping window 78 lists all of the mappings that administrator 34 has created.

Table I lists different types of mappings that may be created by administrator 34 at step 54 to convert source data to target data. These mappings are described here by way of example, and other conversion functions will be apparent to those skilled in the art.

TABLE I

Mapping types

1. Direct copy from a column in the data source to an element or attribute in the DTD.

2. Apply a conversion function to a column in the data source, and create an element or an attribute in the DTD.

3. Apply a conversion function to a set of columns in the data sources, and create an element or an attribute in the DTD. The columns may belong to different data sources.

4. Select certain rows in the data source, and copy each one to an element or attribute in the DTD.

5. Select certain rows in the data source, apply a conversion function to each selected row, and create an element or attribute in the DTD.

6. Join tables in the data sources to one element in the DTD, by combining rows from several tables. The tables may belong to different data source.s 7. Aggregate data from the data source with a simple function, given by the XSLT rules—for example, find the average response time per day. Copy the aggregated data to an element or attribute in the DTD.

8. Aggregate data from the data source with a complex conversion function, i.e., a function that is not given by the XSLT and must therefore be coded. Copy the aggregated data to an element or attribute in the DTD.

9. Mappings that include parameters—for example, copy column cpu_utilization_objective to $cpu_objective, wherein the parameter cpu_objective can get different values in each execution of lookup engine 40.

As noted above, the mappings created at step 54 are preferably recorded as XSLT rules. Tables II and III below are examples of XSLT code that implements two rules of this sort. Table II is a mapping of the first type (direct copy) listed in Table I, while Table III is a mapping of the eighth type (aggregation with complex conversion).

TABLE II

XSLT Direct Copy source - 'fqhn' column of table 'perform.server'
target - attribute 'Server_id' of element 'Server_Configuration_Info' in DTD
conversion function - none (also called Direct)
XSLT template -
```
<xsl:template match="//TABLE
    [@name='perform.server']">
    <xsl:for-each select="ROW">
        <Server_Configuration_Info>
            <xsl:attribute name="Server_id">
                <xsl:value-of select="fqhn/@Value"/>
            </xsl:attribute>
        </Server_Configuration_Info>
    </xsl:for-each>
</xsl:template>
```

TABLE III

XSLT Row Conversion source - all rows of table 'perform.c_day'
target - element 'Server' in DTD
conversion function - 'FillStaticInfo' method of the Java class 'FillStaticServerInfo'
XSLT template -
```
<xsl:template match="★">
    <xsl:variable name=group1"
    select="//TABLE[@name='perform.c_day']/ROW"/>
    <xsl:variable name="answer"
    select="java:FillStaticServerInfo.FillStaticInfo
        ($group1)"/>
    <Server>
        <xsl:value-of select="$answer"/>
    </Server>
</xsl:template>
```

Although preferred embodiments described herein make use of certain particular markup languages and tools, such as XML, DTDs and XSLT, further embodiments of the present invention using other markup languages and associated tools will be apparent to those skilled in the art. Furthermore, although these preferred embodiments relate particularly to methods for reading data from data sources 32, the principles of the present invention may similarly be extended, *mutatis mutandis*, to carry out database transactions, such as writing data. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing source data from a plurality of diverse sources in a selected data domain, comprising:
   specifying a unified schema that is defined specifically for the selected data domain, from among a multiplicity of schemata that are specific to different data domains selected from a group of domains consisting of computer system performance evaluation, customer relationship management, healthcare, and telecommunications, the specified schema listing markup tags in the selected data domain that can exist in a document in the markup language;
   defining correspondences of data fields from the sources to the markup tags listed by the selected schema; and
   mapping the source data in accordance with the correspondences to generate unified data in the markup language,
   wherein at least some of the source data are represented in a language other than the markup language, and wherein mapping the source data comprises transforming the data to the markup language.

2. A method according to claim 1, wherein the markup language comprises Extensible Markup Language (XML).

3. A method according to claim 2, wherein specifying the unified schema comprises specifying a Document Type Definition (DTD).

4. A method according to claim 2, wherein defining the correspondences comprises defining data transformation rules in Extensible Style Language (XSL).

5. A method according to claim 4, wherein mapping the source data comprises transforming the data using an XSL engine.

6. A method according to claim 1, wherein defining the correspondences comprises selecting one or more of the data fields in the sources to correspond to one of the markup tags in the schema, and determining a conversion function to apply to the one or more data fields.

7. A method according to claim 6, wherein determining the conversion function comprises determining the function so as to generate a data element indicated by the corresponding one of the markup tags.

8. A method according to claim 6, wherein determining the conversion function comprises determining the function to generate an attribute of the unified data indicated by the corresponding one of the markup tags.

9. A method according to claim 1, and comprising querying the sources by addressing a query to the unified data in the markup language.

10. A method for processing source data from a plurality of diverse sources in a selected data domain, comprising:
    specifying a unified schema that is defined specifically for the selected data domain, from among a multiplicity of schemata that are specific to different data domains selected from a group of domains consisting of computer system performance evaluation, customer relationship management, healthcare, and telecommunications, the specified schema listing markup tags in the selected data domain that can exist in a document in the markup language;
    defining correspondences of data fields from the sources to the markup tags listed by the selected schema;
    mapping the source data in accordance with the correspondences to generate unified data in the markup language; and
    querying the sources by addressing a query to the unified data in the markup language,
    wherein mapping the source data comprises mapping the source data responsive to the query.

11. Apparatus for processing source data from a plurality of diverse sources in a selected data domain, comprising a data integration processor, which is adapted to receive and store a unified schema that is defined specifically for the selected data domain, from among a multiplicity of schemata that are specific to different data domains selected from a group of domains consisting of computer system performance evaluation, customer relationship management, healthcare, and telecommunications, the schema listing markup tags in the selected data domain that can exist in a document in the markup language, and which is further adapted to receive and store definitions of correspondences of data fields from the sources to the markup tags listed by the schema, and to map the source data in accordance with the correspondences to generate unified data in the markup language, wherein at least some of the source data are represented in a language other than the markup language, and wherein the processor is adapted to transform the data to the markup language.

12. Apparatus according to claim 11, wherein the markup language comprises Extensible Markup Language (XML).

13. Apparatus according to claim 12, wherein the unified schema comprises a Document Type Definition (DTD).

14. Apparatus according to claim 12, wherein the definitions of the correspondences comprise data transformation rules in Extensible Style Language (XSL).

15. Apparatus according to claim 14, wherein the processor is adapted to map the source data by transforming the data using an XSL engine.

16. Apparatus according to claim 11, wherein each of the definitions of the correspondences comprise a selection of one or more of the data fields in the sources to correspond to at least one of the markup tags in the schema, together with a conversion function to be applied by the processor to the one or more source fields.

17. Apparatus according to claim 11, wherein the processor is adapted to receive and respond to a query addressed to the unified data in the markup language.

18. Apparatus according to claim 11, and comprising a plurality of distributed data storage devices, which hold the diverse data sources, wherein the processor is adapted to retrieve the source data from the distributed devices.

19. Apparatus for processing source data from a plurality of diverse sources in a selected data domain, comprising a data integration processor, which is adapted to receive and store a unified schema that is defined specifically for the selected data domain, from among a multiplicity of schemata that are specific to different data domains selected from a group of domains consisting of computer system performance evaluation, customer relationship management, healthcare, and telecommunications, the schema listing markup tags in the selected data domain that can exist in a document in the markup language, and which is further adapted to receive and store definitions of correspondences of data fields from the sources to the markup tags listed by the schema, and to map the source data in accordance with the correspondences to generate unified data in the markup language, wherein the processor is adapted to receive and respond to a query addressed to the unified data in the markup language, and wherein the processor is adapted to map the source data responsive to the query.

20. A computer software product for processing source data from a plurality of diverse sources in a selected data domain, the product comprising a computer-readable medium in which program instructions are stored, which instructions, when read by a computer, cause the computer to receive a unified schema that is defined specifically for the selected data domain, from among a multiplicity of schemata that are specific to different data domains selected from a group of domains consisting of computer system performance evaluation, customer relationship management, healthcare, and telecommunications, the schema listing markup tags in the selected data domain that can exist in a document in the markup language, the instructions further causing the computer to receive definitions of correspondences of data fields from the sources to the markup tags listed by the schema, and to map the source data in accordance with the correspondences to generate unified data in the markup language, wherein the instructions further cause the computer to accept and respond to a query addressed to the unified data in the markup language, wherein the product comprises middleware, which causes the computer to map the source data responsive to the query.

21. A product according to claim 20, wherein the markup language comprises Extensible Markup Language (XML).

22. A product according to claim 21, wherein the unified schema comprises a Document Type Definition (DTD).

23. A product according to claim 21, wherein the definitions of the correspondences comprise data transformation rules in Extensible Style Language (XSL).

24. A product according to claim 23, wherein the instructions cause the computer to transform the data using an XSL engine.

25. A product according to claim 20, wherein at least some of the source data are represented in a language other than the markup language, and wherein the middleware causes the computer to transform the data to the markup language.

26. Apparatus for processing source data from a plurality of diverse sources in diverse formats in a selected data domain, comprising a data integration processor, which is adapted to receive and store a unified schema that lists markup tags in the selected data domain that can exist in a document in the markup language, and to receive and store definitions of correspondences of data fields from the sources to the markup tags listed by the schema, and which is further adapted to receive a query with respect to the sources in the markup language, and upon receiving the query, to map the source data from at least one of the diverse formats to the unified schema responsively to the query in accordance with the correspondences so as to generate a reply to the query, so that the reply comprises unified data in the markup language.

27. A computer software product for processing source data from a plurality of diverse sources in diverse formats in a selected data domain, the product comprising a computer-readable medium in which program instructions are stored, which instructions, when read by a computer, cause the computer to receive a unified schema that lists markup tags in the selected data domain that can exist in a document in the markup language and to receive definitions of correspondences of data fields from the sources to the markup tags listed by the schema, the instructions further causing the computer to receive a query with respect to the sources in the markup language, and upon receiving the query, to map the source data from at least one of the diverse formats to the unified schema responsively to the query in accordance with the correspondences so as to generate a reply to the query, so that the reply comprises unified data in the markup language.

28. A product according to claim 27, wherein the product comprises middleware, which causes the computer to map the source data responsively to the query.

29. A product according to claim 28, wherein at least some of the source data are represented in a language other than the markup language, and wherein the middleware causes the computer to transform the data to the markup language.

* * * * *